United States Patent [19]

Kikkawa

[11] 4,135,942
[45] Jan. 23, 1979

[54] KERATIN MEMBRANE

[75] Inventor: Masayoshi Kikkawa, Isehara, Japan

[73] Assignee: Agency of Industrial Science & Technology, Tokyo, Japan

[21] Appl. No.: 814,844

[22] Filed: Jul. 11, 1977

[30] Foreign Application Priority Data

Jul. 12, 1976 [JP] Japan .................. 51/82031

[51] Int. Cl.² ............................................. C08L 89/06
[52] U.S. Cl. .................................. 106/155; 106/161; 260/123.7; 264/41
[58] Field of Search ...................... 106/161, 124, 155; 260/123.7; 264/202, 212

[56] References Cited

U.S. PATENT DOCUMENTS 3,642,498  2/1972  Anker .................. 260/123.7

Primary Examiner—Theodore Morris
Attorney, Agent, or Firm—Armstrong, Nikaido, Marmelstein & Kubovcik

[57] ABSTRACT

Keratin membrane containing aliphatic polyvalent alcohol having excellent toughness and flexibility and showing excellent ion-permeability.

5 Claims, No Drawings

KERATIN MEMBRANE

BACKGROUND OF THE INVENTION

The present invention relates to an improved keratin membrane.

Heretofore, keratin membranes have been prepared by dissolving the feather or fur of animals into an aqueous solution of reducing agent or oxidizing agent or the aqueous solution containing protein modifying agent therein and removing insoluble matters and the reducing agent or the oxidizing agent used as solubilizing agent from the obtained solution and then forming the film. However, the keratin membranes thus obtained are very fragile and easily broken in use. Especially, thinner keratin membranes remarkably show such tendency and are frequently broken in use of storage. Moreover, the conventional keratin membranes show less ion-permeability and, therefore, they are not sufficient as dialysis membranes.

A primary object of the present invention is to provide a keratin membrane having excellent toughness and flexibility and excellent ion-permeability.

Other objects and advantages of the present invention will appear from the following description.

SUMMARY OF THE INVENTION

The objects of the present invention are achieved by providing a keratin membrane containing aliphatic polyvalent alcohol.

PREFERRED EMBODIMENT OF THE INVENTION

Aliphatic polyvalent alcohols which find use as membrane-improving agent for keratin permeable membrane may be selected from aliphatic di- or more valent alcohols. Preferable aliphatic polyvalent alcohols include glycerol, ethylene glycol, propylene glycol, poly-ethylene glycol (preferably having molecular weight of less than about 2000), poly-propylene glycol (preferably having molecular weight of less than about 2000), pentaerythritol, pentitol and hexitol.

In the keratin membrane of the present invention, alphatic polyvalent alcohol may be preferably contained in the range of 1–15g, more preferably 3–10g, based on 1 gram of dry keratin.

In preparing the keratin membrane of the present invention, aliphatic polyvalent alcohol may be added into an aqueous solution of keratine and the aqueous solution thus obtained may be converted to any desirable shape in accordance with conventional methods.

In the method for preparing the mebrane mentioned above, the aqueous solution may be preferably prepared as follows. The fur or feather of animals is dissolved in an aqueous solution containing solubilizing agent such as oxidizing agent or reducing agent. As the fur or feather of animals to be used above, the fur of goat, sheep, horse, pig, cattle or rabit, or the feather of various birds may be preferably used. As the solubilizing agent, reducing agent, such as sodium thioglycolate, or oxidizing agent, such as performic acid, which can cause reductive or oxidative scission of disulfide bonding of keratin, may be preferably used.

From the solution thus obtained, insoluble matters are removed by means of centrifugal separation or the like and the solubilizing agent is removed by means of dialysis method or the like.

The aqueous solution thus obtained may preferably contain about 0.5 to 3% by weight of keratin, calculated in terms of weight of keratin protein.

Aliphatic polyvalent alcohol is added into the aqueous solution, and the solution thus obtained may be formed into any desirable body, shape or design suitable for use in the dialysis processes, such as a film or a tubular form. For example, a film or thin sheet membrane is prepared by casting the solution onto a support such as a glass plate, plastic plate or a metal plate. The membrane is preferably 10 to 100$\mu$ thick.

Aliphatic polyvalent alcohol remains in the membrane with excellent compatibility for a long period of time to impart excellent toughness and flexibility to the membrane. For example, even if the membrane of the present invention is dried in vacuum in the presence of calcium chloride for a few days, the flexibility is completely maintained and any breakage is not occurred for a long period of time in use or in storage.

When the membrane above obtained is washed with water to remove an excess of polyvalent alcohol contained therein, the membrane showing remarkably improved ion-permeability can be obtained. The permeability may be optionally controlled by changing the degree of above treatment.

Hereinafter, the present invention is explained by Examples.

EXAMPLE 1

Preparation of an aqueous solution of keratin

Feather of white Leghorn hens, 200g, was extracted with 5 l. of ethanol for 24 hours, followed by extraction with 3 l. of diethyl ether for 24 hours, then the residual feather was dried in air and washed with distilled water to obtain purified feather.

Twenty (20) g of the feather thus obtained were added to 50 ml. of an aqeuous solution of sodium thioglycolate having pH 11.0 and stirred at 50° C. for 4 hours. Insoluble matters were separated by means of centrifugal separation (centrifugal force $10^4$ g) for 15 minutes and a supernatant liquid (aqueous solution of keratin, containing reducing agent) was obtained. The solution was subjected to dialysis in a dialysis tube (diameter 21.4 m/m) by using distilled water. The reducing agent was nearly removed. The dialysis was stopped when an insolubilized product due to production of disulfide bonding in keratin molecule was recognized on the wall of the dialysis tube. The aqueous solution of keratin was again susjected to centrifugal separation (centrifugal force $9 \times 10^3$ g) for 10 minutes to remove produced insoluble matters and to obtain an aqueous solution of keratin as a supernatant liquid. The aqueous solution of keratin contained 3.34 mg. of total nitrogen per ml. and the concentration corresponded to 59.26% by weight of dry feather sample. In other words, the solution contained 2.24% by weight of keratin, calculated in terms of weight of keratin protein. Intrinsic viscosity of the aqueous solution was 0.98 (100 ml/g) at 25° C.

EXAMPLE 2

Into the aqueous solution of keratin obtained in Example 1 above, 4.6 g and 9.2 g of glycerol (98.5%) were mixed, respectively. After deaeration by means of water jet pumping for 4 hours, the solution was casted onto a horizontal vessel made of acryl resin and naturally dried at 20° C., 53% humidity to obtain keratin membranes.

Tensile strength and elastic mudulus of the membranes are shown in Table 1.

TABLE 1

| No. | Amount (g) of Glycerol added per gram of Keratin | Thickness (m/m) | Tensile Strength (g/cm$^2$) | Elastic Modulus (dyn/cm$^2$) |
|---|---|---|---|---|
| 1. | 4.6 g | 0.17 | 310 | $1.11 \times 10^7$ |
|  |  | 0.52 | 210 | $0.86 \times 10^7$ |
| 2. | 9.2 g | 0.25 | 280 | $1.50 \times 10^7$ |
|  |  | 0.52 | 250 | $1.02 \times 10^7$ |

The membrane was easily prepared in accordance with the method mentioned above and was not broken at measuring the physical properties.

After drying in vacuum for 3 days, the tensile strength was almost the same or somewhat increased and the elastic modulus was decreased but only little.

EXAMPLE 3

Into the aqueous solution of keratin obtained in Example 1, 3-6 g. of polyethylene glycol having different molecular weghts of 60, 300, 600 and 1540 were mixed, respectively. After deaeration by means of water jet pumping for 4 hours, the solution was casted onto a horizontal vessel made of acryl resin and naturally dried at 20° C., 53% humidity to obtain keratin membranes. Tensile strength and elastic modulus of the membranes are shown in Table 2, in which PEG means polyethylene glycol and MW means molecular weight.

TABLE 2

| No. | Amount (g) added per gram of keratin, of | | Thickness (mm) | Tensile Strength (kg/cm$^2$) | Elastic Modulus (dyn/cm$^2$) |
|---|---|---|---|---|---|
|  | MW | PEG |  |  |  |
| 1. | 62 | 6 | 0.13 | 0.52 | $0.08 \times 10^7$ |
| 2. | 300 | 3 | 0.32 | 0.28 | $2.01 \times 10^7$ |
| 3. | 600 | 3 | 0.37 | 0.32 | $1.38 \times 10^7$ |
| 4. | 1540 | 3 | 0.30 | 1.26 | $0.13 \times 10^7$ |

As is clear from the above Table 2, various keratin membranes having different strength, elasticity and flexibility can be obtained by changing the molecular weight and the amount of polyethylene glycol.

After drying in vacuum as in Example 2 above, the tensile strength was almost the same or somewhat increased, the elastic mudulus was little decreased and the flexibility was not substantially changed.

EXAMPLE 4

Ion permeability was measured. The membranes obtained in Examples 2 and 3 were cut to 5 × 5 cm and subjected to electrodialysis for 30 hours and the permeability was measured by means of conductometric tester (manufactured by Yokogawa-Hewlett-Packard, Ltd., 4255 A Type), with respect to potassium chloride.

Comparison tests were conducted in connection with membranes obtained from other protein and conventional cellophane membranes. The test results are shown in Table 3, in which G and PEG respectively mean glycerol and polyethylene glycol.

TABLE 3

| No. | Membranes | Additives Sort | Amount (g) added per gram of keratin | Potassium Chloride Permeability $K^d/A$ (cm$^2$/sec)* |
|---|---|---|---|---|
| 1. | Keratin | G | 4.6 | $1.38 \times 10^{-5}$ |
| 2. | Keratin | G | 9.2 | $1.38 \times 10^{-5}$ |
| 3. | Keratin | PEG.MW 300 | 3 | $1.15 \times 10^{-5}$ |
| 4. | Keratin | PEG.MW 600 | 3 | $1.10 \times 10^{-5}$ |
| 5. | Cellophane | — | — | $0.18 \times 10^{-5}$ |
| 6. | Collagen | — | — | $1.13 \times 10^{-5}$ |

*K Permeability
$d$ Thickness
A Transmittance Area

From Table 3 above, it appears that the membrane of the present invention shows high permeability of about seven (7) times in comparison to conventional membrans and shows almost equal or somewhat higher permeability in comparison with collagen membranes.

It was recognized that the membrane of the present invention shows excellent anti-swelling properties to water.

The keratin membrane containing glycol was quite similar with the keratin membrane containing glycerol. Keratin membranes containing two and three kinds of additives mentioned above had almost the same flexibility and permeability as the membranes obtained in Examples 2, 3 and 4.

The membranes containing additives having different specific volume or molecular weight showed excellent permeability.

What is claimed is:

1. Keratin membrane containing aliphatic polyvalent alcohol in an amount of from 1 to 15 gm. based on one (1) gram of dry keratin.

2. Keratin membrane according to claim 1, in which said aliphatic polyvalent alcohol is alkylene glycol.

3. Keratin membrane according to claim 1, in which said aliphatic polyvalent alcohol is polyalkylene glycol.

4. Keratin membrane according to claim 1, in which said aliphatic polyvalent alcohol is glycerol.

5. Keratin membrane according to claim 1, in which said membrane is subjected to water washing.

* * * * *